(12) United States Patent
Yamane et al.

(10) Patent No.: US 8,818,597 B2
(45) Date of Patent: Aug. 26, 2014

(54) VEHICLE CONTROL DEVICE

(75) Inventors: Katsuyasu Yamane, Tochigi-ken (JP); Kentaro Yoshimura, Dublin, OH (US); Suguru Asakura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/697,131

(22) PCT Filed: Apr. 13, 2011

(86) PCT No.: PCT/JP2011/059218
§ 371 (c)(1),
(2), (4) Date: Nov. 9, 2012

(87) PCT Pub. No.: WO2011/142203
PCT Pub. Date: Nov. 17, 2011

(65) Prior Publication Data
US 2013/0066507 A1   Mar. 14, 2013

(30) Foreign Application Priority Data

May 13, 2010   (JP) .................................. 2010-111364

(51) Int. Cl.
*B60R 25/02* (2013.01)
*B60W 50/08* (2012.01)
*B60R 16/00* (2006.01)
*B60R 16/023* (2006.01)
*B60W 50/02* (2012.01)

(52) U.S. Cl.
CPC .......... *B60R 16/0232* (2013.01); *B60W 50/082* (2013.01); *B60R 16/00* (2013.01); *B60W 50/02* (2013.01); *B60R 25/02* (2013.01)
USPC ........................................... 701/22; 307/10.6

(58) Field of Classification Search
USPC ........................................... 701/22; 307/10.6
See application file for complete search history.

(56) References Cited

U.S. PATENT DOCUMENTS

| | | | |
|---|---|---|---|
| 2003/0225493 A1* | 12/2003 | Patterson et al. ................ | 701/45 |
| 2008/0227598 A1* | 9/2008 | Sigmund ......................... | 477/92 |
| 2010/0017056 A1* | 1/2010 | Asakura et al. .................. | 701/36 |
| 2010/0090526 A1* | 4/2010 | Itou ............................... | 307/10.6 |
| 2010/0100295 A1* | 4/2010 | Inoue et al. ..................... | 701/69 |

FOREIGN PATENT DOCUMENTS

| | | |
|---|---|---|
| JP | 2003-252174 | 9/2003 |
| JP | 2003-278629 | 10/2003 |
| JP | 2005-140015 | 6/2005 |
| JP | 2006-283727 | 10/2006 |

(Continued)

OTHER PUBLICATIONS

Japanese Office Action dated Apr. 8, 2014 with partial English translation, 4 pages.

*Primary Examiner* — Mary Cheung
*Assistant Examiner* — Yuen Wong
(74) *Attorney, Agent, or Firm* — Rankin, Hill & Clark LLP

(57) ABSTRACT

When predetermined conditions in a vehicle are met, the control means of the disclosed vehicle control device prohibits control of the state of power-source supply to vehicle-mounted equipment or the operating state of a drive source resulting from a pressing operation of a push switch. When it is detected that an abnormal state has arisen in the vehicle, the control means allows control by the pressing operation of the push switch even if the aforementioned predetermined conditions are met.

6 Claims, 4 Drawing Sheets

(56) References Cited

FOREIGN PATENT DOCUMENTS

| | | |
|---|---|---|
| JP | 2007-023919 | 2/2007 |
| JP | 2007-263020 | 10/2007 |
| JP | 2009-243351 | 10/2009 |
| JP | 2010-048106 | 3/2010 |

* cited by examiner

VEHICLE CONTROL DEVICE

TECHNICAL FIELD

The present invention relates to a vehicle control device having a push switch disposed in the passenger compartment of a vehicle that is pressed by the driver of the vehicle, and a control means for controlling the manner in which a drive source of the vehicle operates, or the manner in which electric power is supplied to a vehicle-mounted component, in response to pressing of the push switch. When a predetermined condition in the vehicle is met, the control means is prevented from performing a control operation in response to pressing of the push switch.

BACKGROUND ART

A smart key system is known, including a portable electronic key and a control device capable of wirelessly communicating with the electronic key. The smart key system controls unlocking and locking of doors as well as starting and stopping of an engine through wireless communications (an authenticating process) carried out between the electronic key and the control device. See, for example, Japanese Laid-Open Patent Publication No. 2003-278629 (hereinafter referred to as "JP2003-278629A").

According to JP2003-278629A, it is judged whether or not a vehicle is traveling based on a vehicle information signal representative of vehicle speed information or the like. If the vehicle is traveling, then a switch (19) for controlling starting/stopping (on/off) of an engine is inhibited from being pressed, and a pressing operation signal from the switch is invalidated, so that a process will not be performed based on pressing of the switch (see paragraphs [0023], [0024], [0039]).

SUMMARY OF INVENTION

According to JP2003-278629A, as described above, the switch is inhibited from being pressed, whereupon a pressing operation signal is invalidated. According to JP2003-278629A, however, no consideration is given as to how to handle an abnormal state suffering a lack of information for judging whether or not the vehicle is traveling, which may arise due to some fault (e.g., disconnection of a vehicle speed sensor) while the vehicle is traveling. In the event of such an abnormal state, the system disclosed in JP2003-278629A fails to cope with the situation sufficiently, and the system is not made sufficiently convenient for the driver. Even though it may be possible to judge whether or not the vehicle is traveling, the system would be more convenient for the driver by permitting the driver to press the switch while the vehicle is traveling, if the engine must be forcibly stopped in the event of a fault.

The present invention has been made in view of the above problems. It is an object of the present invention to provide a vehicle control device, which is convenient for the driver of a vehicle in the event of a fault of the vehicle.

According to the present invention, there is provided a vehicle control device including a push switch disposed in a passenger compartment of a vehicle and capable of being pressed by a driver of the vehicle, and a control unit which is capable of performing a control process for controlling a state of operation of a drive source of the vehicle, or a state of supply of electric power to a vehicle-mounted component, in response to pressing of the push switch, wherein the control unit inhibits the control process in response to pressing of the push switch when a prescribed condition is met in the vehicle.

The vehicle control device comprises a fault detecting unit for detecting an occurrence of a fault in the vehicle, wherein, if the occurrence of the fault is detected by the fault detecting unit, the control unit permits the control process in response to pressing of the push switch regardless of whether or not the prescribed condition has been met.

If the prescribed condition is met, the control unit inhibits the control process for controlling the state of operation of the drive source, or the state of supply of electric power to the vehicle-mounted component, in response to pressing of the push switch. If occurrence of a fault in the vehicle is detected, the control unit permits the control process. Therefore, when a fault has not occurred in the vehicle, whether the control process in response to pressing of the push switch is permitted or inhibited is controlled depending on whether or not the prescribed condition is met. When a fault has occurred in the vehicle, the control process in response to pressing of the push switch is permitted even if the prescribed condition is met. Consequently, if a fault has occurred in the vehicle in which a condition is set for causing the push switch not to function, the push switch is still allowed to function in the event of a fault, thereby providing more convenience to the driver.

The push switch may comprise a switch for turning on and off, i.e., starting and stopping, the drive source of the vehicle, i.e., an engine, a traction motor, or the like. The prescribed condition may be a condition indicating that the vehicle is currently traveling.

If the prescribed condition is not met, the control unit may permit the control process in response to pressing of the push switch according to a first operating method. If the prescribed condition is met, the control unit may inhibit the control process in response to pressing of the push switch according to the first operating method, and permit the control process in response to pressing of the push switch according to a second operating method, which requires a longer operating period or more operating events than the first operating method. If the occurrence of the fault is detected by the fault detecting unit, the control unit may permit the control process in response to pressing of the push switch according to the first operating method, regardless of whether or not the prescribed condition has been met.

Therefore, when the prescribed condition is met, the control unit permits the control process for controlling the state of operation of the drive source or the state of supply of electric power to the vehicle-mounted component according to the second operating method, which requires a longer operating period or more operating events than the first operating method. The driver is thus prevented from performing an erroneous operation. If occurrence of a fault in the vehicle is detected, the control unit permits the control process according to the first operating method, which requires a shorter operating period or fewer operating events than the second operating method, regardless of whether or not the prescribed condition has been met. Since the control process can be carried out quickly, further convenience is provided to the driver.

The vehicle control device may further include a receiving unit which is capable of receiving a monitoring signal successively sent from another control unit mounted on the vehicle and indicating whether or not a system controlled by the other control unit is operating normally, or an operation signal from an air bag mounted on the vehicle. The fault detecting unit may detect the occurrence of the fault based on non-reception of the monitoring signal by the receiving unit, or based on reception of the operation signal from the air bag by the receiving unit.

The control unit thus detects the occurrence of a fault based on non-reception of the monitoring signal by the receiving unit, or based on reception of the operation signal from the air bag by the receiving unit. Irrespective of whether the monitoring signal or the operation signal is used, since such signals are related to the occurrence of a fault in the vehicle, the occurrence of a fault can be detected accurately. If the operation signal is used, when the air bag is activated, the possibility that other components may be suffering from a fault is much higher than usual. Under such circumstances, the control process, which is initiated in response to pressing of the push switch based on the operation signal, provides more convenience to the driver.

The other control unit may comprise at least one of a vehicle speed sensor, a road wheel speed sensor, a shift position sensor, a fuel injection controller, and a vehicle stability assistance controller, for example.

The vehicle control device may further comprise a speed acquiring unit that is capable of detecting a type of road on which the vehicle is traveling, and capable of acquiring a set speed established depending on the type of road, and a vehicle speed detecting unit for detecting a speed of the vehicle. The fault detecting unit may judge that the fault has occurred if the speed detected by the vehicle speed detecting unit exceeds a speed that the vehicle should not travel at continuously for a predetermined period on the type of road detected by the speed acquiring unit.

When the speed of the vehicle exceeds a speed that the vehicle should not travel at continuously for a predetermined period, the vehicle is presumed to be suffering from a fault. With the above arrangement, in order to handle the fault, the control unit permits the control process in response to pressing of the push switch, even if the prescribed condition is met. If the push switch is a switch for turning on and off the drive source, then it is possible to turn off the drive source in order to lower the vehicle speed. Even in a special situation in which the driver presses the accelerator pedal rather than the brake pedal by mistake, the driver can press the push switch in order to control the state of operation of the drive source and the state of supply of electric power to the vehicle-mounted component.

The vehicle control device may further comprise a simultaneous operation detecting unit which is capable of detecting when an accelerator pedal and a brake pedal are operated simultaneously, a braking device for generating a braking force applied to the vehicle in response to operation of the brake pedal, and a posture stabilizer for controlling the braking device to hold the vehicle in a stable posture. The fault detecting unit may judge that the fault has occurred when the simultaneous operation detecting unit detects that the accelerator pedal and the brake pedal are operated simultaneously. The control unit may cut off a drive force from the drive source of the vehicle while maintaining the braking device and the posture stabilizer actuated, if pressing of the push switch is detected when the fault detecting unit judges that the fault has occurred.

Generally, if the accelerator pedal and the brake pedal are operated simultaneously, then the driver is considered to be performing an erroneous operation, unless the driver is intentionally using a special technique such as a heel-and-toe technique or the like. With the above arrangement, in order to cope with such an erroneous operation, the vehicle can be decelerated with rolling resistance, since the drive force from the drive source of the vehicle is cut off. Further, since the braking device and the posture stabilizer remain actuated during this time, the vehicle can be decelerated in a stable posture.

The vehicle control device may further comprise a steering lock device for locking a steering wheel of the vehicle against rotation in response to inactivation of the drive source of the vehicle, or in response to cutting-off of supply of electric power to the vehicle-mounted component. The control unit may inhibit the steering lock device from locking the steering wheel against rotation if the control unit detects inactivation of the drive source of the vehicle, or detects cutting-off of supply of electric power to the vehicle-mounted component when the fault detecting unit detects the occurrence of the fault. Therefore, when a fault due to occurrence of an accident is detected, the steering wheel is inhibited from being locked, so as to allow the vehicle to be moved smoothly, thereby providing additional convenience to the driver.

DESCRIPTION OF EMBODIMENTS

A. Embodiment

1. Description of Overall Arrangement

Figure 1:
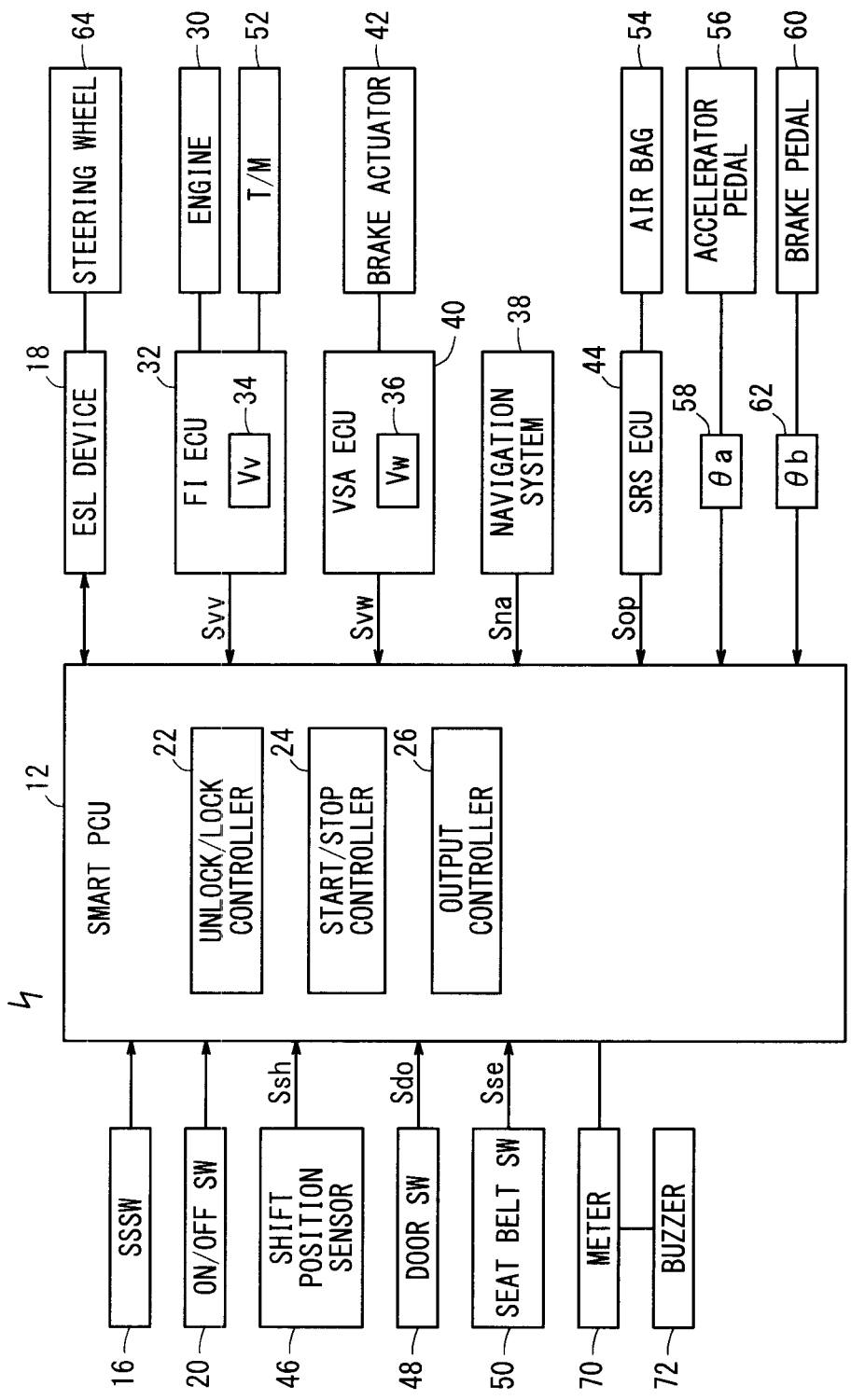
FIG. 1 is a block diagram of a vehicle incorporating therein a smart power control unit as a vehicle control device according to an embodiment of the present invention.
Figure 2:
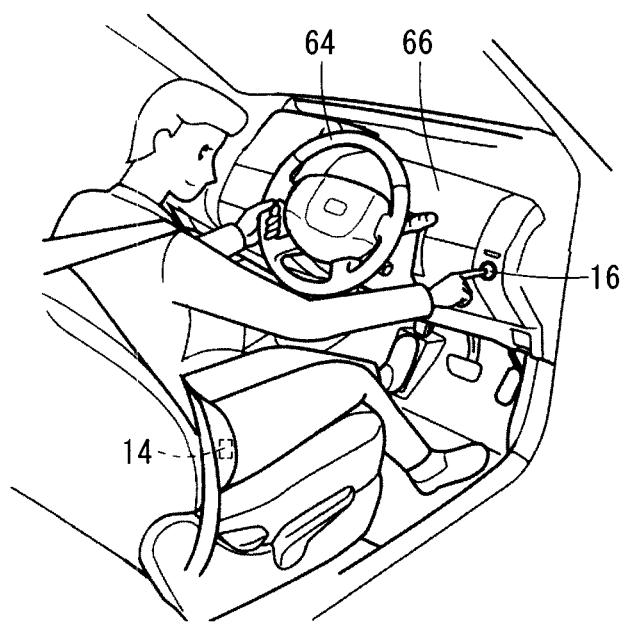
FIG. 2 is a perspective view illustrating a manner in which the smart power control device is operated.

FIG. 1 is a block diagram of a vehicle 10 incorporating therein a smart power control unit 12 (hereinafter referred to as a "smart PCU 12") as a vehicle control device according to an embodiment of the present invention. FIG. 2 is a perspective view illustrating the manner in which the smart PCU 12 is operated. The vehicle 10 comprises a gasoline vehicle, for example. The vehicle 10 may alternatively be a hybrid vehicle or an electric vehicle including a fuel cell vehicle.

The vehicle 10, which includes a so-called smart entry function and a so-called smart start function, includes, in addition to the smart PCU 12, a portable electronic key 14, a push-type engine start/stop switch 16 (hereinafter referred to as an "SSSW 16", where SSSW implies a Start/Stop Switch), an electric steering lock device 18 (hereinafter referred to as an "ESL device 18"), and a smart PCU on/off switch 20 (hereinafter referred to as an "on/off SW 20").

The smart PCU 12 comprises an input/output unit, a processor, a storage unit, and a wireless communication unit, etc. The smart PCU 12 has, as functional units thereof, an unlock/lock controller 22 (hereinafter also referred to as a "controller 22"), a start/stop controller 24 (hereinafter also referred to as a "controller 24" (control unit, fault detecting unit, receiving unit, simultaneous operation detecting unit), and an output controller 26 (hereinafter also referred to as a "controller 26").

The unlock/lock controller 22 controls unlocking and locking of doors, not shown. More specifically, the controller 22 performs an authenticating process based on wireless communications with the electronic key 14. If the controller 22 successfully authenticates the electronic key 14, then the controller 22 allows the doors to be unlocked. If a predetermined action is made on a button (not shown) on one of the doors, or if a given period of time elapses after no wireless communications have taken place between the controller 22 and the electronic key 14, then the controller 22 locks the doors.

The start/stop controller 24 controls starting and stopping of an engine 30 on the vehicle 10. More specifically, if a condition for starting the engine 30 is met while the engine 30 is at rest, then the controller 24 controls a fuel injection controller 32 (hereinafter referred to as an "FI ECU 32") in order to start the engine 30.

When the controller 24 starts the engine 30, the controller 24 allows electric power to be supplied to a vehicle speed sensor 34, a road wheel speed sensor 36, a vehicle stability assistance controller 40 (hereinafter referred to as a "VSA ECU 40") (posture stabilizer), and a supplemental restraint system control unit 44 (hereinafter referred to as an "SRS ECU 44"). More specifically, the controller 24 starts to supply electric power to the components by turning on respective on/off switches (not shown), which are connected to power lines (not shown) extending between the components and a battery (not shown).

The controller 24 judges whether or not the engine 30 should be started based on respective output signals Ssh, Sdo, Sse from a shift position sensor 46, a door switch 48 (hereinafter referred to as a "door SW 48"), and a seat belt switch 50 (hereinafter referred to as a "seat belt SW 50"). The shift position sensor 46 detects the position of a shift lever (not shown), and the door SW 48, which is installed in each door (not shown), detects whether the door is open or closed. The seat belt SW 50, which is combined with each seat belt (not shown), detects whether or not the seat belt is fastened.

When the driver operates the SSSW 16 while the engine 30 is in operation, the controller 24 judges whether or not operation of the SSSW 16 meets a condition for performing a process of stopping the engine 30. If the condition is met, then the controller 24 performs a process of stopping the engine 30, as will be described in detail later.

The controller 24 judges whether or not the engine 30 should be stopped based on respective output signals Svv, Svw, Sna, Sop from the vehicle speed sensor 34, the road wheel speed sensor 36, a navigation system 38 (speed acquiring unit), and the SRS ECU 44.

The vehicle speed sensor 34 comprises a first Hall device (not shown) for detecting rotation of a countershaft (not shown) of a transmission 52 (hereinafter referred to as a "T/M 52"), and a first processor (not shown) for calculating a vehicle speed Vv [km/h] based on an output signal from the first Hall device. The first processor is included in the FI ECU 32.

The road wheel speed sensor 36 comprises a second Hall device (not shown) for detecting rotation of each road wheel (not shown) of the vehicle 10, and a second processor (not shown) for calculating a road wheel speed Vw [km/h] based on an output signal from the second Hall device. The second processor is included in the VSA ECU 40.

The navigation system 38, which serves to perform route guidance for an input destination, stores types and speed limits of roads in association with map information. According to the present embodiment, the navigation system 38 identifies the type and speed limit of the road on which the vehicle 10 is currently traveling, and sends an output signal representative of the identified speed limit to the smart PCU 12.

The VSA ECU 40 serves as part of a vehicle stability assistance system (VSA system) and controls the VSA system in its entirety. The VSA system includes a brake actuator 42 (braking device) mounted on each road wheel. The VSA system also controls an antilock braking system (ABS) for preventing each road wheel from becoming locked when the vehicle 10 is braked, a traction control system (TCS) for preventing each road wheel from spinning when the vehicle 10 is accelerated, and an electronic stability control system for preventing the vehicle 10 from slipping in a sidewise direction when the vehicle 10 makes a turn.

The SRS ECU 44 serves as part of a supplemental restraint system (SRS) for controlling the SRS in its entirety. The SRS has an air bag 54. When the air bag 54 is operated (i.e., if the air bag 54 inflates), the SRS ECU 44 applies an output signal Sop (operation signal), which is indicative of operation of the air bag 54, to the smart PCU 12.

The output controller 26 of the smart PCU 12 controls the output power of the engine 30 through the FI ECU 32 depending on a manipulated variable $\theta a$ [degrees] of an accelerator pedal 56, which is detected by a first manipulated variable sensor 58. The output controller 26 also controls the brake actuator 42 through the VSA ECU 40 depending on a manipulated variable $\theta b$ [degrees] of a brake pedal 60, which is detected by a second manipulated variable sensor 62.

In order to prevent the vehicle 10 from being stolen, the ESL device 18 locks a steering wheel 64 against rotation when the vehicle 10 is turned off.

The on/off SW 20 is a switch for selectively turning the smart PCU 12 on and off. Normally, the on/off SW 20 is kept on. The smart PCU 12 may be turned off when the start/stop controller 24 is turned off, for example. More specifically, according to the present embodiment, as described later, if a certain condition is met, e.g., if the vehicle 10 has traveled at an excessively high speed continuously for a prescribed period during traveling of the vehicle 10, then the driver simply operates the SSSW 16 in order to perform a process of stopping the engine 30. If the driver determines that the process of stopping the engine 30 should not be performed while the vehicle 10 is traveling along a circuit, then the driver turns off the on/off SW 20.

2. Start and Stop Control of the Engine 30 and Related Components (1) Start Control of Engine 30 and Related Components If the driver undertakes a prescribed action on the SSSW 16 while the engine 30 and related components thereof (i.e., the FI ECU 32, the vehicle speed sensor 34, the road wheel speed sensor 36, the VSA ECU 40, the SRS ECU 44, etc.) are at rest, then the start/stop controller 24 judges whether or not other conditions for starting the engine 30 have been met. As shown in FIG. 2, the SSSW 16 is mounted on an instrument panel 66 at a position to the right of the steering wheel 64 as viewed in the traveling direction of the vehicle 10. Each time that the driver presses the SSSW 16, the SSSW 16 toggles between an "OFF" state in which the engine 30 does not operate, an "ACC" (accessory) state in which the engine 30 does not operate and accessories such as the navigation system 38, an audio system, etc., are turned on, and an "ON" state in which the engine 30 can be operated. If the brake pedal 60 is pressed while the SSSW 16 is pressed to select the "ON" state, then the controller 24 starts the engine 30.

If other conditions for starting the engine 30 are met, then the controller 24 starts the engine 30 through the FI ECU 32. Other conditions for starting the engine 30 include a condition in which an authentication process between the electronic key 14 and the controller 24 is successful, a condition in which the shift lever position is in "P" (park), etc. The shift lever position is judged based on an output signal Ssh from the shift position sensor 46. If one of the doors is open, or if one of the seat belts is not fastened when the SSSW 16 is pressed to select the "ON" state, then the controller 24 controls a meter 70 (FIG. 1) in order to energize a warning lamp, and energizes a buzzer 72 to alert the driver.

(2) Stop Control of Engine 30 and Related Components

Figure 3:
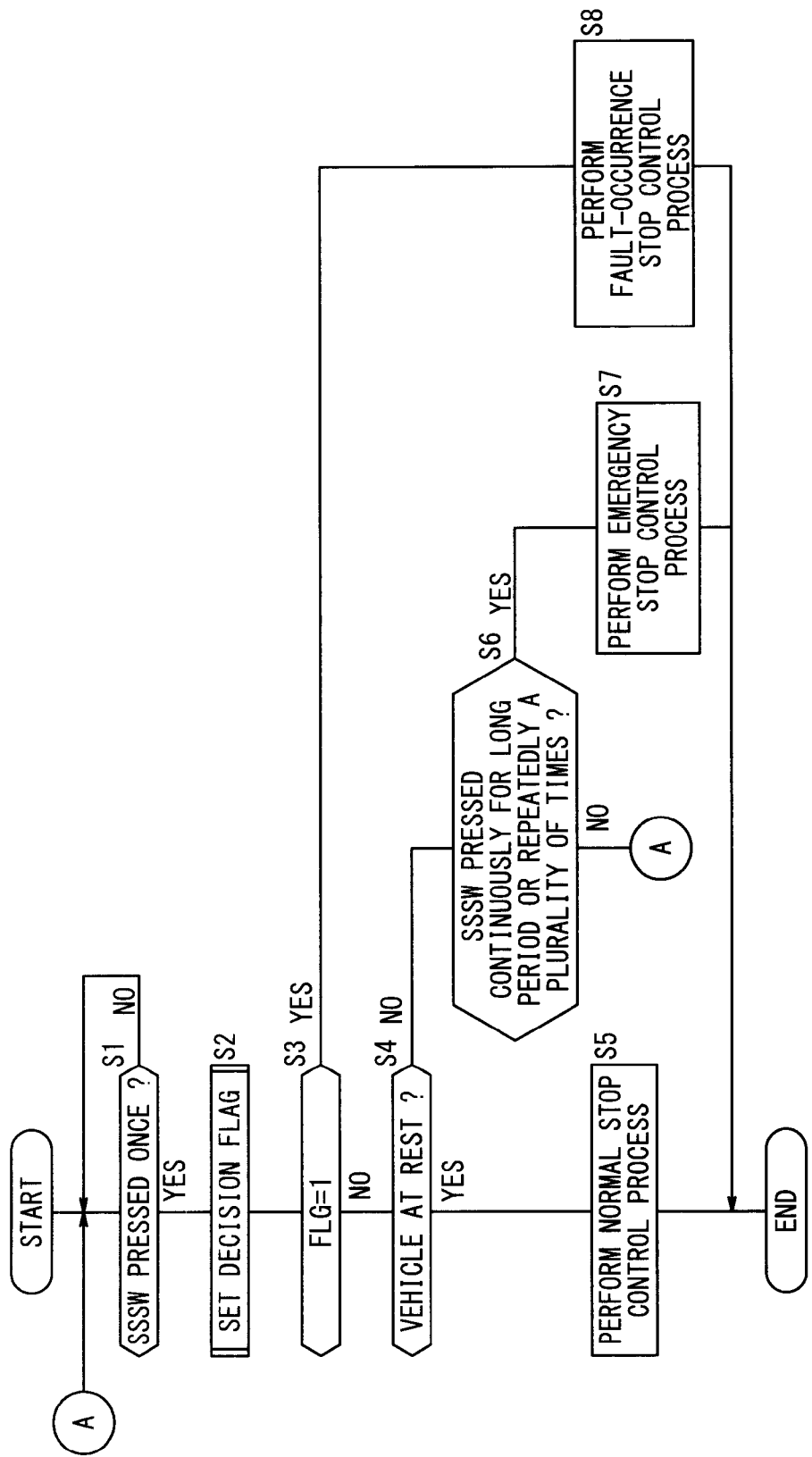
FIG. 3 is a flowchart of a sequence for selecting a control process for stopping an engine and related components according to the embodiment.

FIG. 3 is a flowchart of a sequence for selecting a control process for stopping the engine 30 and related components. In step S1, the start/stop controller 24 of the smart PCU 12 judges whether or not the SSSW 16 has been pressed once while the engine 30 is in operation. If the SSSW 16 has not been pressed (S1: NO), then step S1 is repeated. If the SSSW 16 has been pressed (S1: YES), then in step S2, the controller 24 judges the condition of a decision flag FLG, which is indicative of whether or not a fault has occurred in the vehicle 10.

Figure 4:
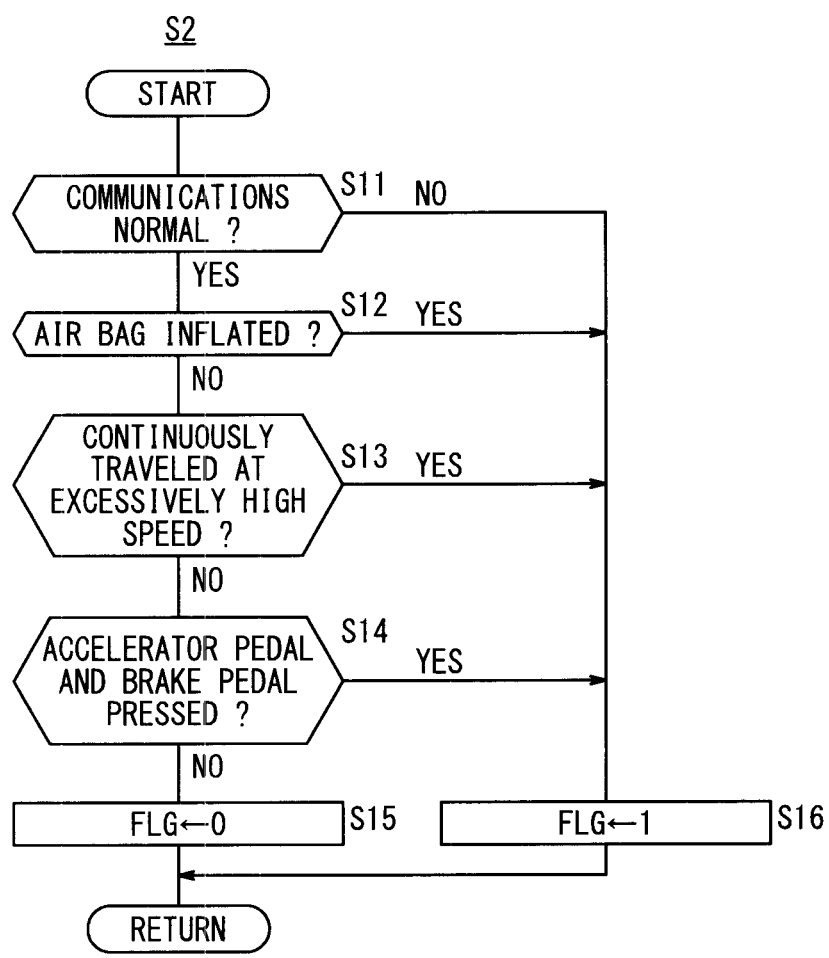
FIG. 4 is a flowchart of a sequence for calculating a decision flag in the control process shown in FIG. 3.

FIG. 4 is a flowchart of a sequence for judging the condition of the decision flag FLG. In step S11, the controller 24 judges whether or not communications with other components are normal. The other components include the FI ECU 32 (vehicle speed sensor 34), the VSA ECU 40 (road wheel speed sensor 36), the SRS ECU 44, and the shift position sensor 46. The vehicle 10 according to the present embodiment is designed such that the smart PCU 12 judges that the vehicle 10 is currently traveling if communications between the smart PCU 12 and any one of the ECUs 32, 40, 44 and the sensor 46 become faulty and fail during traveling of the vehicle 10.

For example, if the smart PCU 12 fails to receive an output signal Svv from the vehicle speed sensor 34 of the FI ECU 32, then the smart PCU 12 regards the vehicle 10 as traveling and controls various components. Similarly, if the smart PCU 12 fails to receive an output signal Svw from the road wheel speed sensor 36 of the VSA ECU 40, then the smart PCU 12 regards the vehicle 10 as traveling and controls various components. Furthermore, if the smart PCU 12 fails to receive an output signal Ssh from the shift position sensor 46, then the smart PCU 12 regards the vehicle 10 as traveling and controls various components.

In step S11, if communications with other components are normal (S11: YES), then in step S12, the controller 24 judges whether or not the air bag 54 is inflated based on the output signal Sop from the SRS ECU 44. If the air bag 54 is not inflated (S12: NO), then in step S13, the controller 24 judges whether the vehicle 10 has been traveling continuously at an excessively high speed, based on the vehicle speed Vv from the vehicle speed sensor 34 and the speed limit from the navigation system 38. For example, the controller 24 uses a sum of the speed limit and the prescribed speed as a speed for judging whether an excessively high speed (decision speed) has occurred, and the controller 24 judges the vehicle 10 as traveling at an excessively high speed if the vehicle speed Vv exceeds the decision speed for a predetermined period. In making this judgment, the controller 24 may use a road wheel speed Vw of the road wheels, e.g., an average speed of the road wheels, instead of the vehicle speed Vv. The road wheel speed Vw represents the speed of the vehicle 10 in a broad sense.

If the vehicle 10 has not been traveling continuously at an excessively high speed (S13: NO), then in step S14, the controller 24 judges whether or not the accelerator pedal 56 and the brake pedal 60 both have been pressed for a predetermined period or longer. If both the accelerator pedal 56 and the brake pedal 60 have not been pressed for a predetermined period or longer (S14: NO), then in step S15, the controller 24 sets the decision flag to "0" in order to indicate that a fault has not occurred.

If communications are not normal (S11: NO), if the air bag 54 is inflated (S12: YES), if the vehicle 10 has been traveling at an excessively high speed (S13: YES), or if the accelerator pedal 56 and the brake pedal 60 both have been pressed (S14: YES), then the controller 24 judges that a fault has occurred in the vehicle 10, and in step S16, the controller 24 sets the decision flag FLG to "1" in order to indicate the occurrence of a fault.

In step S3, as shown in FIG. 3, the controller 24 judges whether or not the decision flag FLG is "1". If the decision flag FLG is not "1" (S3: NO), then in step S4, the controller 24 judges whether or not the vehicle 10 is at rest. The vehicle 10 is judged to be at rest when the vehicle speed Vv and the road wheel speed Vw both are 0 km/h, and the shift lever position is "P" (in park), for example.

If the vehicle 10 is at rest (S4: YES), then in step S5, the controller 24 stops the engine 30 and related components while the vehicle 10 remains at rest (normal stop control process). For example, the controller 24 energizes the ESL device 18 in order to lock the steering wheel 64 against rotation, and the controller 24 stops the engine 30 through the FI ECU 32. Thereafter, the controller 24 stops electric power from being supplied to the FI ECU 32, the navigation system 38, and the VSA ECU 40, etc., thereby turning off the vehicle 10 in its entirety. However, at this time, wireless communications with the electronic key 14 continue. As shown in FIG. 3, the normal stop control process starts when the SSSW 16 is pressed once (first operating method (operating procedure)).

If the vehicle 10 is not at rest in step S4 (S4: NO), then in step S6, the controller 24 judges whether or not a prescribed operation for turning off the power supply while the vehicle 10 is traveling (second operating method (operating procedure)) has been performed on the SSSW 16. The prescribed operation is based on an additional condition other than the operation (first operating method) required to enter the normal stop control process (S5 in FIG. 3), so as to prevent the engine 30 from stopping due to an erroneous operation made by the driver. For example, the prescribed operation may be that the SSSW 16 is pressed repeatedly a given number of times (e.g., three times) (a given number of repetitive pressings), or that the SSSW 16 is pressed continuously for a given period (e.g., three seconds) (continuous pressing for a given period).

If the prescribed operation has not been performed on the SSSW 16 (S6: NO), then control goes back to step S1. In this case, stop control for the engine 30 and related components is not carried out. If the prescribed operation has been performed on the SSSW 16 (S6: YES), then in step S7, the controller 24 stops the engine 30 and related components while the vehicle 10 continues traveling (emergency stop control process). For example, the controller 24 stops the engine 30 through the FI ECU 32. The controller 24 maintains the VSA ECU 40 and the brake actuator 42 in operation until both the vehicle speed Vv and the road wheel speed Vw are 0 km/h, thereby maintaining a braking function and a vehicle stabilizing function for the vehicle 10. When both the vehicle speed Vv and the road wheel speed Vw have become 0 km/h, the controller 24 stops operating the VSA ECU 40 and the brake actuator 42.

Unlike the normal stop control process, in the emergency stop control process the ESL device 18 is not actuated. Stated otherwise, the controller 24 inhibits the steering wheel 64 from being rotated using the ESL device 18. When the power supply is turned off in an emergency, there is a possibility that the vehicle 10 may have been involved in an accident. In this case, a need may arise that requires the vehicle 10 to be towed away, or for the vehicle 10 to be moved with external forces after the vehicle 10 has been stopped. In view of such a possibility, the ESL device 18 is not actuated.

If the decision flag FLG is "1" (S3: YES), then regardless of whether or not the vehicle 10 is traveling, in step S8, the controller 24 begins to stop the engine 30 and related components (fault-occurrence stop control process) after the SSSW 16 has been pressed once. For example, the controller 24 stops the engine 30 through the FI ECU 32. Alternatively, the controller 24 may disconnect the engine 30 and the road wheels (not shown) from each other through the FI ECU 32 and the T/M 52, thereby placing the T/M 52 in a neutral gear position in order to decelerate the vehicle 10 with rolling resistance. Unlike the emergency stop control process, there is a possibility that the driver may have pressed the SSSW 16 by a mistake. According to the latter control alternative (i.e., when the T/M 52 is in a neutral gear position), such a possibility is taken into account, and the driver is prevented from being surprised by sudden deceleration of the vehicle 10, which would otherwise occur.

The latter control alternative is particularly effective if both the accelerator pedal 56 and the brake pedal 60 have been pressed when the vehicle 10 is judged as suffering from a fault (S14 in FIG. 4: YES). In this case, the T/M 52 may be placed in a neutral gear position and the engine 30 may be stopped.

The controller 24 maintains the VSA ECU 40 and the brake actuator 42 in operation until both the vehicle speed Vv and the road wheel speed Vw are 0 km/h, thereby maintaining the braking function and the vehicle stabilizing function of the vehicle 10. However, if the fault occurring in the vehicle 10 is a failure of communications with the vehicle speed sensor 34, the road wheel speed sensor 36, or the VSA ECU 40, then such components cannot be used. When both the vehicle speed Vv and the road wheel speed Vw become 0 km/h, the controller 24 turns off the engine 30, the VSA ECU 40, and the brake actuator 42.

As with the emergency stop control process, in the fault-occurrence stop control process, the ESL device 18 is not actuated.

If the power supply is turned off by the fault-occurrence stop control process, then when the engine 30 is started the next time, the driver does not press the brake pedal 60, but presses the SSSW 16 once to start the engine 30. Thus, the engine 30 can be started with ease, making it easy to handle the fault.

3. Advantages of the Present Embodiment

According to the present embodiment, as described above, while the vehicle 10 is traveling, the engine 30 and related components are not stopped when the SSSW 16 is pressed once (the normal stop control process is inhibited from being initiated). If occurrence of a fault in the vehicle 10 is detected, the engine 30 and related components are stopped when the SSSW 16 is pressed once (the normal stop control process is allowed to be initiated). Consequently, when no fault has occurred, the condition for starting the control process in order to stop the engine 30 and related components, i.e., the method of operating the SSSW 16, is changed depending on whether or not the vehicle 10 is currently traveling. When a fault has occurred, the condition for starting the control process in order to stop the engine 30 and related components while the vehicle 10 is traveling (fault-occurrence stop control process) is made to match the condition for starting the control process, in order to stop the engine 30 and related components while the vehicle 10 is at rest (normal stop control process). This provides convenience to the driver.

While the vehicle 10 is at rest, the controller 24 allows the engine 30 and related components to be stopped when the driver presses the SSSW 16 once (first operating method). If the driver presses the SSSW 16 once (first operating method) while the vehicle 10 is traveling, the controller 24 inhibits the control process for stopping the engine 30 and related components (normal stop control process), but permits the control process for stopping the engine 30 and related components (emergency stop control process) if the driver presses the SSSW 16 repeatedly three times or continuously for 3 seconds (second operating method). When occurrence of a fault is detected, the controller 24 permits the control process for stopping the engine 30 and related components (fault-occurrence stop control process) to be initiated when the driver presses the SSSW 16 once (first operating method), regardless of whether or not the vehicle 10 is traveling.

Accordingly, while the vehicle 10 is traveling, the controller 24 permits the control process for stopping the engine 30 and related components (emergency stop control process) according to the second operating method, which requires a longer operating period or more operating events than the first operating method. Thus, the driver is prevented from making an erroneous operation. When occurrence of a fault in the vehicle 10 is detected, the controller 24 permits the control process for stopping the engine 30 and related components (fault-occurrence stop control process) according to the first operating method, which requires a shorter operating period or fewer operating events than the second operating method, regardless of whether or not the vehicle 10 is traveling. Therefore, the engine 30 can be stopped quickly, providing more convenience to the driver.

According to the above embodiment, the controller 24 detects the occurrence of a fault based on non-reception of any one of the output signals Svv, Svw, Ssh from the vehicle speed sensor 34, the road wheel speed sensor 36, and the shift position sensor 46, or based on reception of the output signal Sop from the air bag 54. Therefore, the controller 24 detects the occurrence of a fault based on the output signals Svv, Svw, Ssh, Sop. Since any one of the used output signals Svv, Svw, Ssh, Sop is related to the occurrence of a fault in the vehicle 10, the controller 24 can accurately detect the occurrence of a fault. In the event that the output signal Sop is used, when the air bag 54 is activated, there is a high possibility that other components also are suffering from faults. Under such circumstances, the control process, which is initiated when the SSSW 16 is pressed based on the output signal Sop, offers more convenience to the driver.

According to the above embodiment, based on the vehicle speed Vv from the vehicle speed sensor 34 and the speed limit from the navigation system 38, the controller 24 judges whether the vehicle 10 has been continuously traveling at an excessively high speed. If the vehicle speed Vv of the vehicle 10 exceeds a speed that the vehicle 10 should not travel at continuously for a predetermined period, then the vehicle 10 is presumed to be suffering from a fault. According to the above embodiment, in order to handle the fault, the controller 24 permits the control process for stopping the engine 30 and related components (fault-occurrence stop control process) when the driver presses the SSSW 16 once, even while the vehicle 10 is traveling. The engine 30 is turned off, thereby lowering the vehicle speed Vv. Consequently, even in a special situation in which the driver presses the accelerator pedal 56 rather than the brake pedal 60 by a mistake, the driver can turn off the engine 30 simply by pressing the SSSW 16 once.

According to the above embodiment, the controller 24 judges that a fault has occurred when the controller 24 detects that the accelerator pedal 56 and the brake pedal 60 are operated simultaneously. If the SSSW 16 is pressed once while the controller 24 judges that a fault has occurred, then the controller 24 cuts off drive power from the engine 30, i.e., places the T/M 52 in a neutral gear position, and controls the VSA ECU 40 in order to maintain the control process thereof, including the braking function and the vehicle stabilizing function.

Generally, if the accelerator pedal 56 and the brake pedal 60 are operated simultaneously, then the driver is considered to be performing an erroneous operation, unless the driver is using a special technique such as a heel-and-toe technique or the like. According to the above embodiment, in order to cope with such an erroneous operation even while the vehicle 10 is traveling, the controller 24 brings the T/M 52 into a neutral gear position when the SSSW 16 is pressed once, so that the vehicle 10 is decelerated with rolling resistance. Therefore, even if the accelerator pedal 56 and the brake pedal 60 are pressed simultaneously due to driver error, it is possible for the driver to stop the vehicle 10 by pressing the SSSW 16. Since the VSA ECU 40 and the brake actuator 42 remain actuated at this time, the vehicle 10 can be decelerated in a stable manner.

According to the above embodiment, if occurrence of a fault is detected, then the controller 24 controls the ESL device 18 in order to lock the steering wheel 64 against rotation, even if the engine 30 is turned off. Therefore, when a fault is detected due to occurrence of an accident, the steering wheel 64 is inhibited from being locked, to thereby allow the vehicle 10 to be moved smoothly. Such a feature provides additional convenience to the driver.

B. Modifications

The present invention is not limited to the above embodiment, but various arrangements may be adopted therein based on the descriptive content of the present invention. For example, the present invention may adopt the following alternative arrangements.

In the above embodiment, the vehicle 10 is a gasoline vehicle. However, the vehicle 10 may be a hybrid vehicle, or an electric vehicle including a fuel cell vehicle. According to such a modification, the object to be controlled by the controller 24 of the smart PCU 12 is a traction motor, for example, rather than the engine 30. More specifically, while the vehicle 10 is traveling, the traction motor is not de-energized when the SSSW 16 is pressed once, i.e., when the first operating method is carried out. If a fault has occurred, then the traction motor is de-energized according to the first operating method. Alternatively, a stop control process for a fuel cell system may be employed rather than the stop control process for the engine 30.

In the above embodiment, the SSSW 16 is pressed once in order to stop the engine 30 and related components while the vehicle 10 is at rest, and the SSSW 16 is pressed repeatedly three times or continuously for three seconds in order to stop the engine 30 and related components while the vehicle 10 is traveling. However, the present invention is not limited to the latter process, insofar as a more complex process may be required while the vehicle 10 is traveling.

In the above embodiment, the emergency stop control process is permitted to be initiated even while the vehicle 10 is traveling, when the SSSW 16 is pressed repeatedly three times or continuously for three seconds. However, the present invention is not limited to the above process. Alternatively, if no fault has occurred while the vehicle 10 is traveling, stop control for the engine 30 may not be permitted, i.e., the SSSW 16 may be inhibited from being pressed or the output signal from the SSSW 16 may be invalidated, as disclosed in JP2003-278629A.

In the above embodiment, while the vehicle 10 is not at rest, the engine 30 and other components are inhibited from being stopped even if the SSSW 16 is pressed (S4 in FIG. 3: NO→S6: NO→S1). However, the condition for inhibiting the control process based on the pressing of the SSSW 16 is not limited to the above process. For example, a condition in which the ESL device 18 is in operation, a condition in which the shift lever position is not in "P" (park), or a condition in which communications are not established between the smart PCU 12 and the electronic key 14, may be used as the condition for inhibiting the control process based on pressing of the SSSW 16. Further, if any one of these conditions is met, the control process based on pressing of the SSSW 16 may be permitted after occurrence of a fault in the vehicle 10 has been detected.

In the above embodiment, the condition for operating the ESL device 18 during the normal stop control process (S5 in FIG. 3) is defined by the vehicle 10 being at rest (S4: YES). For the vehicle 10 to be at rest, all of the following conditions, i.e., the vehicle speed Vv and the road wheel speed Vw both are 0 km/h and the shift lever position is "P", must be met, for example. However, the present invention is not limited to the foregoing condition. Alternatively, the condition for operating the ESL device 18 during the normal stop control process may be defined by anything that directly or indirectly indicates that the engine 30 is stopped, or anything that directly or indirectly indicates cutting-off of supply of electric power to certain components, e.g., the FI ECU 32, the navigation system 38, the VSA ECU 40, the SRS ECU 44, etc., which are supplied with electric power when the SSSW 16 is turned on, and which are not supplied with electric power when the SSSW 16 is turned off. For example, the ESL device 18 may be triggered into operation by the controller 24 when the controller detects that the SSSW 16 has switched from the turned-on state to the turned-off state.

The invention claimed is:

1. A vehicle control device including a push switch and a control unit, the push switch is disposed in a passenger compartment of a vehicle and capable of being pressed by a driver of the vehicle, and the control unit is configured to permit and inhibit a control process for controlling operation of a drive source of the vehicle, or a state of supply of electric power to a vehicle-mounted component, the vehicle control device comprising:

a fault detecting unit for detecting an occurrence of a fault in the vehicle, wherein:

the control unit is configured to permit the control process in response to pressing of the push switch once according to a first operating method when the occurrence of the fault is not detected by the fault detecting unit and the prescribed condition is not met;

the control unit is configured to inhibit the control process in response to pressing of the push switch according to the first operating method when the occurrence of the fault is not detected by the fault detecting unit and the prescribed condition is met, and to permit the control process in response to pressing of the push switch according to a second operating method when the occurrence of the fault is not detected by the fault detecting unit and the prescribed condition is met, the second operating method requiring pressing the push switch continuously for a longer period than that of the first operating method, or pressing the push switch repeatedly a greater number of times than for the first operating method; and the control unit is configured to permit the control process in response to pressing of the push switch once according to the first operating method when the occurrence of the fault is detected by the fault detecting unit, regardless of whether or not the prescribed condition has been met.

2. The vehicle control device according to claim 1, further comprising:
a receiving unit which is capable of receiving a monitoring signal successively sent from another control unit mounted on the vehicle and indicating whether or not a system controlled by the other control unit is operating normally, or an operation signal from an air bag mounted on the vehicle,
wherein the fault detecting unit detects the occurrence of the fault based on non-reception of the monitoring signal by the receiving unit, or based on reception of the operation signal from the air bag by the receiving unit.

3. The vehicle control device according to claim 1, further comprising:
a speed acquiring unit that is capable of detecting a type of road on which the vehicle is traveling, and capable of acquiring a set speed established depending on the type of road; and
a vehicle speed detecting unit for detecting a speed of the vehicle,
wherein the fault detecting unit judges that the fault has occurred if the speed detected by the vehicle speed detecting unit exceeds a speed that the vehicle should not travel at continuously for a predetermined period on the type of road detected by the speed acquiring unit.

4. The vehicle control device according to claim 1, further comprising:
a simultaneous operation detecting unit which is capable of detecting when an accelerator pedal and a brake pedal are operated simultaneously;
a braking device for generating a braking force applied to the vehicle in response to operation of the brake pedal; and
a posture stabilizer for controlling the braking device to hold the vehicle in a stable posture,
wherein the fault detecting unit judges that the fault has occurred when the simultaneous operation detecting unit detects that the accelerator pedal and the brake pedal are operated simultaneously; and
the control unit cuts off a drive force from the drive source of the vehicle while maintaining the braking device and the posture stabilizer actuated, when pressing of the push switch is detected when the fault detecting unit judges that the fault has occurred.

5. The vehicle control device according to claim 1, further comprising:
a steering lock device for locking a steering wheel of the vehicle against rotation in response to inactivation of the drive source of the vehicle, or in response to cutting-off of supply of electric power to the vehicle-mounted component,
wherein the control unit inhibits the steering lock device from locking the steering wheel against rotation when the control unit detects inactivation of the drive source of the vehicle, or detects cutting-off of supply of electric power to the vehicle-mounted component when the fault detecting unit detects the occurrence of the fault.

6. The vehicle control device according to claim 1, wherein the prescribed condition is a condition indicating that the vehicle is currently traveling.

* * * * *